United States Patent
Forget

(10) Patent No.: US 9,823,542 B2
(45) Date of Patent: Nov. 21, 2017

(54) GENERATOR OF SHORT OPTICAL PULSES HAVING A VERY HIGH TEMPORAL CONTRAST

(71) Applicant: FASTLITE, Valbonne (FR)

(72) Inventor: Nicolas Forget, Nice (FR)

(73) Assignee: FASTLITE, Valbonne (FR)

( * ) Notice: Subject to any disclaimer, the term of this patent is extended or adjusted under 35 U.S.C. 154(b) by 0 days.

(21) Appl. No.: 15/039,045

(22) PCT Filed: Nov. 28, 2014

(86) PCT No.: PCT/FR2014/053074
§ 371 (c)(1),
(2) Date: May 25, 2016

(87) PCT Pub. No.: WO2015/079181
PCT Pub. Date: Jun. 4, 2015

(65) Prior Publication Data
US 2017/0038660 A1    Feb. 9, 2017

(30) Foreign Application Priority Data

Nov. 28, 2013 (FR) .................... 13 61741
Nov. 28, 2014 (FR) .................... 14 61624

(51) Int. Cl.
*G02F 1/39* (2006.01)
*G02F 1/35* (2006.01)
*G02F 1/37* (2006.01)

(52) U.S. Cl.
CPC ............. *G02F 1/39* (2013.01); *G02F 1/353* (2013.01); *G02F 1/37* (2013.01);
(Continued)

(58) Field of Classification Search
CPC ... G02F 1/353; G02F 1/37; G02F 1/39; G02F 2001/3507; G02F 2001/392; G02F 2201/16; G02F 2203/26
See application file for complete search history.

(56) References Cited

U.S. PATENT DOCUMENTS

2005/0238070 A1* 10/2005 Imeshev ............... G02F 1/3558
372/21
2017/0031232 A1* 2/2017 Forget ..................... G02F 1/353

OTHER PUBLICATIONS

Li et al., "Carrier-envelope phase stabilized high temporal contrast femtosecond laser source at 1053 nm", Laser Phys. Lett., vol. 10, No. 7, May 23, 2013, p. 075403 (4 pp).*

(Continued)

*Primary Examiner* — Daniel Petkovsek
(74) *Attorney, Agent, or Firm* — Young & Thompson

(57) ABSTRACT

A system for generating short optical pulses having a very high temporal contrast at a wavelength λ, includes: a generator of optical pulses B1 outputting pulses at a wavelength substantially equal to λ; a generator of optical pulses P, B2 outputting pulses at a wavelength substantially equal to 2*λ3; a device R for recombining the pulses from the generators; a parametric amplifier A receiving the output of the recombination device R as an input; a filter F2 extracting, from the output of the parametric amplification device A, a band centered about a wavelength equal to 2*λ; a second harmonic generator NL receiving the output of the filter F2, at the input; a filter F3 centered about a wavelength equal to λ, extracting the second harmonic wavelengths of the pulses produced by the second harmonic generator NL.

20 Claims, 2 Drawing Sheets

(52) U.S. Cl.
CPC ............... *G02F 2001/3507* (2013.01); *G02F 2001/392* (2013.01); *G02F 2201/16* (2013.01); *G02F 2203/26* (2013.01)

(56) References Cited

OTHER PUBLICATIONS

Shah et al., "High-temporal contrast using low-gain optical parametric amplification", Optics Letters, vol. 34, No. 15, Aug. 1, 2009, pp. 2273-2275.*

* cited by examiner

Figures 1, 3:
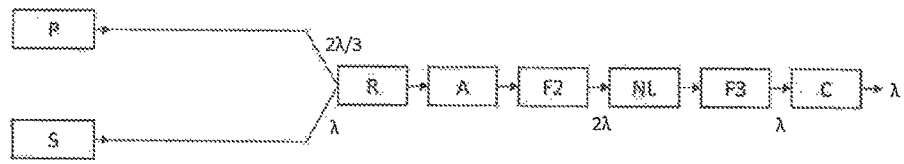
Figures 2, 3:
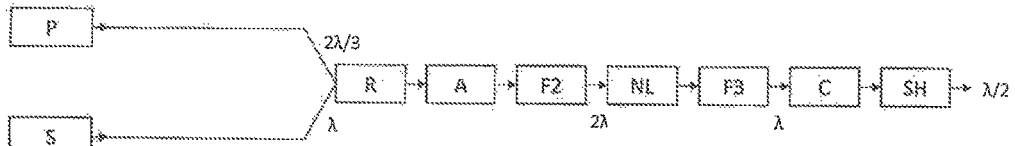
Figure 3:
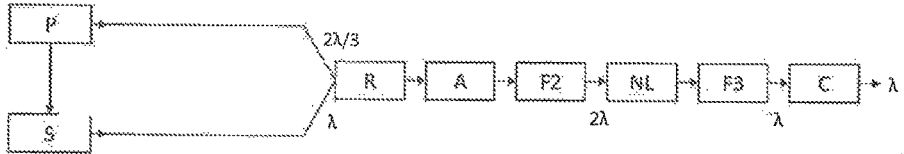

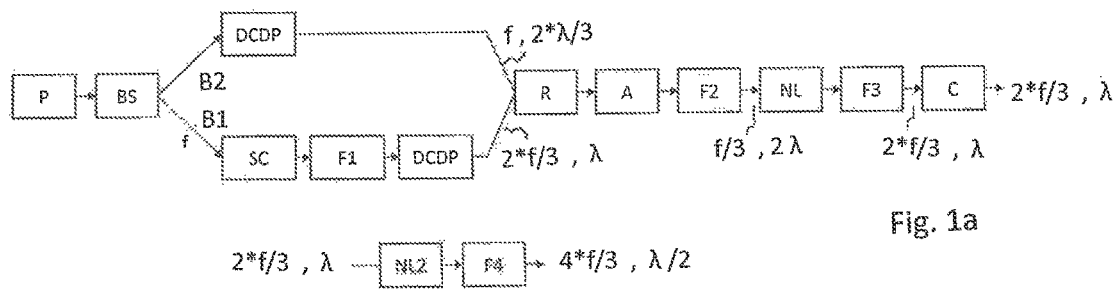
Fig. 1a
Fig. 1b
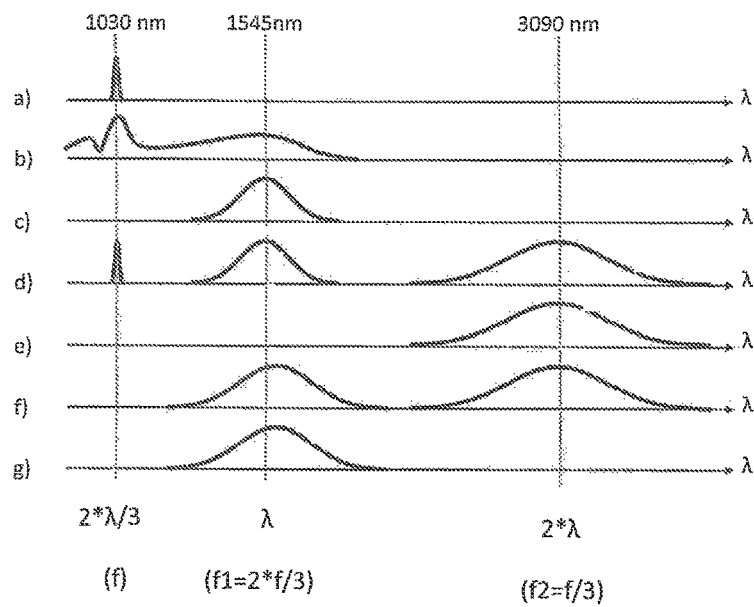
Fig. 2

GENERATOR OF SHORT OPTICAL PULSES HAVING A VERY HIGH TEMPORAL CONTRAST

BACKGROUND OF THE INVENTION

Field of the Invention

This invention relates to a generator of short optical pulses having a very high temporal contrast.

Description of the Related Art

Generally, it is known that pulsed laser sources are characterised by a temporal confinement of the light emission. This confinement makes it possible to carry out laser-material interactions, in conditions that combine a very short duration and a very high instant power for a given energy of the laser pulse. The first characteristic of this pulse is its duration such as defined for example by the temporal separation between the two instants when the emitted power is half the maximum power (duration at mid-height). This characteristic is not however sufficient for defining the pertinent properties of the source. Indeed, the existence of low power levels, such as for example the thousands of the maximum power, at instants offset from the instant of the maximum by a delay that is significantly greater than the duration at mid-height (for example a few picoseconds), are able to profoundly disturb the laser-material interaction. By way of example, the interaction of a pulse with a high power density with a solid target will be fully disturbed if the central pulse is preceded by parasite power levels that exceed the ionisation limit of the atmosphere surrounding the solid target. This limit can be much less than the maximum power.

We are therefore led to characterise an ultrafast pulse source by its temporal contrast. The notion of temporal contrast designates the ratio of the intensity between the maximum of the illuminance at a point (expressed in W or $W/cm^2$) and the illuminance at this same point but at different instants. The contrast is characterised by different values at different delays with respect to the main pulse. For example: $10^4$ at −3 ps and $10^{14}$ at −100 ps.

By way of example of mechanisms that can produce parasite power levels that degrade the contrast, the following can be mentioned:
- spontaneous emission and amplified spontaneous emission, present in all laser amplifiers,
- parametric fluorescence, present in all optical parametric amplifiers,
- the responses of the main pulse caused by the reflections on the optical surfaces of the transparent mediums passed through,
- the parasite or residual pulses when the main pulse is taken from a pulse train,
- certain amplitude or spectral phase defects induced by the amplification system, the beam transport system, the dielectric treatment (thin reflective or anti-reflective layers), or by surface defects of the optics used in spectrally dispersive systems (draft for example),
- the non-linear effects that couple and aggravate the aforementioned mechanisms.

BRIEF SUMMARY OF THE INVENTION

The purpose of the invention is to minimise the aforementioned effects. Once these effects are reduced to the minimum that is practically possible, it is desirable to introduce into the source methods that improve the contrast. One possibility is to use one or several non-linear optical effects arranged in such a way that the yield of the device is more intense around the maximum intensity that at times far from this maximum due to the dependency of these effects according to the power of the incident signal.

This invention has a source having a high temporal contrast built around an optical parametric amplifier architecture. The amplification of ultrafast laser pulses via parametric effect is described in literature. A "signal" pulse, with central optical frequency f1, interacts in a material having non-linear optical properties with a higher power pulse ("pump" pulse") and with optical frequency f. The frequency content of the "signal" pulse must be wide in order to allow for the production of ultrafast pulses, the "pump" pulse generally being of a narrower spectral band. During the interaction, a portion of the energy of the "pump" pulse is transferred to the "signal" pulse which is amplified. Simultaneously, a third pulse is generated and co-amplified. This third pulse is designated by the term "idler" and the relations for energy conservation impose on this pulse to have as a central frequency $f2=f-f1$.

For the generating of high power pulses, the principle of the parametric amplification is combined with that of drift frequency amplification which consists in temporally extending the "signal" pulse and the "pump" pulse in order to reduce the instant power, with the amplified "signal" being recompressed later in order to obtain a short pulse. This is drift frequency parametric amplification, designated by the acronym OPCPA (Optical Parametric Chirped Pulse Amplification).

Note that the parametric amplification mechanism itself contributes itself in improving the contrast, with the amplification taking place only at instants when the "pump" pulse is effectively present and intense.

Light sources that combine such a parametric amplifier with external non-linear optical devices such as a second harmonic generator or a frequency difference generator with the purpose of increasing the range of frequencies that can be covered have been described in literature (Miller et al., PCT WO 2005/112207 A1).

This invention uses such a combination, but with a different purpose of improving a high pulse contrast. A singular property of the invention, which distinguishes it in particular from Miller et al, is that the output frequency of the device is fixed and deliberately equal to that as input on the "signal" channel. It should appear to those skilled in the art that this complication apparently costly in energy and in complexity is not obvious and that the optical function of the invention is not that of a simple secondary optical source.

In its principle, our invention comprises in particular the following elements:
- A parametric amplifier causing a "pump" of frequency f to interact with a wide band "signal" pulse centred at a frequency $f1<f$.
- An optical filter making it possible to extract from the output of said parametric amplifier the "idler" pulse centred at the frequency $f2=f-f1$
- A second harmonic generator making it possible to obtain using said "idler" pulse a wide band pulse centred at the frequency $2*(f-f1)$.

According to this principle, the maximum value of f1 is f, which corresponds to a zero frequency of the "idler". For a "signal" centred at the frequency $f1=2*f/3$, the central frequency of the "idler" is $f2=f-2*f/3=f/3$. The output of the second harmonic generator is, consequently, centred at the frequency $2*f/3=f1$. The choice of the central frequency of the "signal" ($f1=2*f/3$) is the only one that makes it possible, by means of a frequency difference followed by a second harmonic generation, to retrieve the original central frequency. This choice also constitutes an optimum for generating spectral wide band pulses while still maintaining the possibility of effectively separating the signals concerned in a geometry wherein the "pump", "signal", and "idler" beams propagate in the same direction. The non-overlapping of the "signal" and "idler" spectral bands indeed authorises the use of dichroic mirrors. The collinear interaction geometry between the beams makes it possible to guarantee a good beam spatial quality.

If the source of the "signal" at the frequency f1 were independent of the "pump" laser at the frequency f, the carrying out of the invention would require a complex synchronisation mechanism between these two laser sources, in order to ensure that they are simultaneously present in the parametric amplifier. A preferred embodiment of the invention consists therefore in generating, for example, the source of the "signal" using the "pump" pulse, according to a procedure described for example by Cerullo et al. ("Ultrafast optical parametric amplifiers", Rev. Sci. Instrum. 74, 1 (2003)) Several mechanisms with a non-linear optical base are known for generating a wide band pulse using an intense pulse of a narrower spectral band and with a different central frequency. This is for example the non-linear interaction with the glass in an optical fibre, the non-linear interaction with a solid crystal or the interaction with a gas in a hollow fibre. An interaction of this type will be used in order to generate using the "pump" of frequency f a wide spectrum pulse including the frequency $2*f/3$. A spectral filter can extract from this wide spectrum the frequencies intended to form the "signal" pulse which is then amplified by the parametric amplifier.

A second possibility is to generate the "pump" source using a "signal" pulse by an equivalent mechanism: a non-linear interaction is used to generate using the "signal" with frequency $2*f/3$ a wide spectrum pulse including the frequency f. A spectral filter extracts from this wide spectrum the frequencies intended to form the "pump" pulse which is then amplified by laser power amplifiers.

A third possibility, described, for example, by Adachi et al. ("1.5 mJ, 6.4 fs parametric chirped-pulse amplification system at 1 kHz", Optics Letters, Vol. 32, Issue 17, pp. 2487-2489 (2007)) is to use a source that generates pulses that have a spectral band that covers both the frequency f and the frequency $2*f/3$. A spectral filter extracts from this initial wide spectrum a frequency interval which is then amplified by laser power amplifiers and finally converted by second harmonic generation in order to form the "pump" pulse. A second spectral filter extracts from the initial wide spectrum the frequencies intended to form the "signal" pulse which is then amplified by the parametric amplifier.

In sum the principle of the invention makes it possible, using a "pump" pulse with a narrow spectrum and frequency f, to increase the temporal contrast of a wide spectrum synchronous pulse centred at the frequency $f1=2*f/3$. A high temporal contrast is provided by the following elements:
the principle of the parametric amplification which operates only during the duration of the pump,
the band filtering around the frequencies f1 then $f2=f-f1$, then $2*f2=f1$, which reduce the parasite signals coming from the pump and from the other frequencies present,
the second harmonic generation which reduces all of the low-power signals outside of the main pulse.

According to the invention, a system for generating short optical pulses having a very high temporal contrast, with a spectrum centred at a wavelength $\lambda$, using the principle of the parametric amplification is characterised in that it comprises:
a first generator of optical pulses outputting pulses of a duration less than 10 picoseconds at a wavelength substantially equal to $\lambda$,
a second generator of optical pulses outputting pulses of a duration less than 10 picoseconds at a wavelength substantially equal to $2*\lambda/3$,
a recombination device for collinearly recombining the pulses from the first and second generator,
a parametric amplification device receiving the output of said recombination device as input,
a filter extracting from the output of the parametric amplification device a band centred about a wavelength substantially equal to $2*\lambda$,
a second harmonic generator receiving the output of said preceding filter as input,
another filter centred about a wavelength substantially equal to $\lambda$, extracting the second harmonic wavelengths of the pulses produced by said second harmonic generator.

The first optical pulse generator can use means of amplification by materials doped with Erbium ions.

According to a first embodiment, the first generator of optical pulses and the second generator of optical pulses can be two different sources, with the system further comprising means for synchronising these sources.

According to a second embodiment, the first pulse generator can include non-linear means for outputting pulses of a duration less than 10 picoseconds at a wavelength substantially equal to $\lambda$ using the pulses of a wavelength substantially equal to $2*\lambda/3$ supplied by the second pulse generator.

According to a third embodiment, the second pulse generator comprises non-linear means for outputting pulses of a duration less than 10 picoseconds at a wavelength substantially equal to $2*\lambda/3$ using the pulses of a wavelength substantially equal to $\lambda$ supplied by the first pulse generator.

A system according to the invention can further comprise:
additional devices for controlling the delay and the phase arranged before the recombination devices, in order to optimise the non-linear effects in the parametric amplification device; and, more preferably,
additional devices for controlling the delay and the phase within the filter arranged at the output of the parametric amplification device, in order to optimise the non-linear effects in the second harmonic generator.

The invention also relates to a system for generating short optical pulses having a very high temporal contrast, with a spectrum centred about a wavelength $\lambda/2$, characterised in that it uses a system for generating short optical pulses having a very high temporal contrast, with a spectrum centred at a wavelength $\lambda$ according to the invention and furthermore another second harmonic generator.

Advantageously, such a system comprises means for generating a wavelength $\lambda/2$ compatible with an amplification through the use of Titanium-doped sapphire material.

BRIEF DESCRIPTIONS OF THE DRAWINGS

Several methods of implementing a system according to the invention are described hereinafter, by way of non-limiting examples, with reference to the annexed drawings wherein:

FIGS. 1a and 1b diagrammatically show an embodiment of a system according to the invention;

FIG. 2 diagrammatically shows the spectra obtained in the various steps of the system of FIG. 1; and, FIGS. 3-1 to 3-7 diagrammatically show different other embodiments of the invention.

DETAILED DESCRIPTION OF THE PREFERRED EMBODIMENTS

The invention shall be better understood by considering the following example embodiment shown in the FIGS. 1a and 1b.

As shown in FIG. 1a, a system 1 according to the invention firstly comprises a source of pump P. The source of pump P is comprised of a chain of generation/amplification of pulses with a base of amplifying materials containing Ytterbium ions. It emits intense pulses at a frequency noted as f. In the example shown, the corresponding wavelength is 1030 nm.

The optical output of this source is divided by a separator BS into beams injected respectively into two arms B1 and B2.

The beam of the arm B1 is focussed in a YAG (Neodimium Doped Yttrium Aluminium Garnet) crystal making it possible to generate a supercontinuum (SC) that covers at least the range 1300-1900 nm. The output of this supercontinuum is injected into a filter F1 that makes it possible to select a signal centred on a frequency f1=2*f/3. In the example shown, the frequency f1 corresponds to a wavelength equal to 1545 nm. The beam of the arm B1 is used as a "signal" channel.

The beam of the arm B2 is used as a "pump" channel.

These two beams are combined collinearly in a recombination device R and injected into a parametric amplification device A. Advantageously, the "signal" and "pump" pulses, before recombination, were modified by devices for the control of the delay and of the phase (DCDP) in order to obtain an optimal temporal overlapping of the pulses of the arms B1 and B2, in order to optimise the drift frequency parametric amplification mechanism. Advantageously, the parametric amplification device A has a MgO-doped Lithium Niobate crystal base, of which the polarisation is periodically inverted ("Periodically Poled Lithium Niobate"). This type of device provides a quasi phase tuning between the pulses at 1030 nm, centred on the frequency f, and those comprised in the band 1300-1900 nm, centred on the frequency f1, allowing for the amplification over a wide spectrum band and in collinear configuration with a "signal" centred on the frequency f1, corresponding here to the wavelength of 1545 nm.

The "idler" output centred at 3090 nm is selected by a filter F2 comprised of one or several dichroic mirrors. The output selected as such is injected into a non-linear crystal NL2 also of the MgO type: PPLN operating as a second harmonic generator. A filter F3 of the by-pass type selects the spectral band <2000 nm corresponding to the second harmonic, centred at 1545 nm which is the original "signal" wavelength, corresponding to the frequency f1.

FIG. 2 diagrammatically shows the spectra obtained in the various steps of the system:

The spectrum 2a is the spectrum of the pump;
The spectrum 2b is the spectrum of the supercontinuum;
The spectrum 2c is the spectrum obtained at the output of the filter F1;
The spectrum 2d is the spectrum obtained at the output of the parametric amplifier A;
The spectrum 2e is the spectrum obtained at the output of the filter F2;
The spectrum 2f is the spectrum obtained at the output of the second harmonic generator NL; and,
The spectrum 2g is the spectrum obtained at the output of the filter F3.

The output of the filter F3 is injected into a compressor C in order to obtain one of the short pulses using frequency drift pulses.

The pulses generated as such can be used directly as ultrafast infrared pulses having a high contrast. They can also, as diagrammed in FIG. 1b, be injected into a second harmonic generation device NL2 and filtered by a filter F4 in order to obtain pulses centred at about 772 nm, corresponding to a frequency equal to 4*f/3, which can then be amplified by regenerative amplifiers with a Titanium-doped Sapphire crystal base.

The invention used as such is an alternative to techniques for improving the contrast of regenerative amplifiers. The invention moreover makes it possible to obtain a very high contrast by the successive effects of the parametric amplification and of the two stages of second harmonic generation.

Advantageously, the invention can comprise means, available in prior art, for:

guaranteeing a stable synchronisation between the pulses of the arms B1 and B2 as well as a stable phase relationship between these pulses,
passively and/or actively stabilising the absolute phase of the pulses,
guaranteeing an optimum compression before NL2,
adjusting the spectral width of the filters and, consequently, adapting the duration of the pulses.

Figures 3, 4:
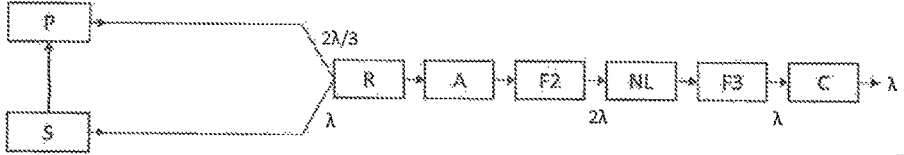
Figures 3, 4, 5:
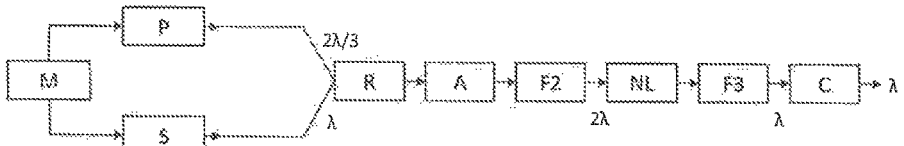
Figures 3, 4, 5, 6:
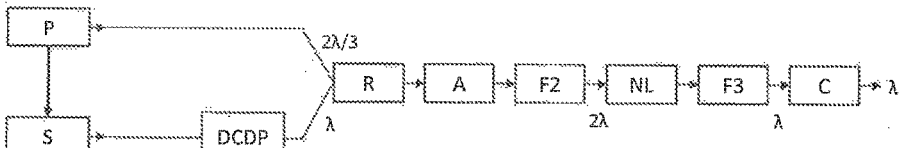
Figures 3, 4, 5, 6, 7:
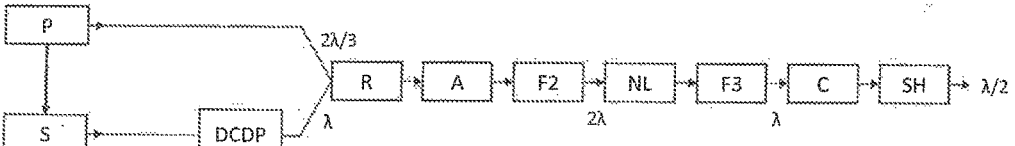

The pulses from the arms B1 and B2 can be, without a loss of generality, from two synchronous optical sources, hereinafter referred to as generators S and P. For reasons of clarity, we shall summarise the methods for implementing and applying the invention in the diagrammatical representations of FIGS. 3-1 to 3-7:

FIG. 3-1 shows an embodiment of the invention with two independent generators P and S;
FIG. 3-2 shows an embodiment of the invention, with two independent generators P and S and a second harmonic generation SH;
FIG. 3-3 shows an embodiment of the invention wherein the generator S is produced using the generator P;
FIG. 3-4 shows an embodiment of the invention wherein the generator P is produced using the generator S;
FIG. 3-5 shows an embodiment of the invention wherein the generators S and P are synchronised by a mechanism M of an optical, electronic or mechanical nature;
FIG. 3-6 shows an embodiment of the invention wherein the generator S is produced using the generator P, including a device for controlling the delay and the phase (DCDP) between S and R and within F2 in order to optimise the non-linear effects in the device A and NL;
FIG. 3-7 shows an embodiment of the invention wherein the generator S is produced using P, including a device for controlling the delay and the phase (DCDP) and including a second harmonic generation (SH).

Of course, the invention is not limited to the examples that have just been described.

The invention claimed is:

1. A system for generating short optical pulses, with a spectrum centered at a wavelength λ, using parametric amplification, the system comprising:

a first generator of optical pulses outputting pulses of a duration less than 10picoseconds at a wavelength substantially equal to $\lambda$;

a second generator of optical pulses outputting pulses of a duration less than 10picoseconds at a wavelength substantially equal to $2*\lambda/3$;

a recombination device configured to collinearly recombine the pulses from the first and second generators;

a parametric amplification device receiving the output of said recombination device as input;

a first filter extracting from the output of the parametric amplification device a band centered about a wavelength substantially equal to $2*\lambda$;

a second harmonic generator receiving the output of said first filter as input; and a second filter centered about a wavelength substantially equal to $\lambda$, extracting the second harmonic wavelengths of the pulses produced by said second harmonic generator.

2. The system according to claim 1, wherein the first generator of optical pulses and the second generator of optical pulses are two different sources, and said system further comprises a synchronization device configured to synchronize said sources.

3. The system according to claim 2, wherein the first generator of optical pulses uses an amplification system to amplify by materials doped with Erbium ions.

4. The system according to claim 2, further comprising:
at least one controller device configured to control the delay and the phase arranged before the recombination device, in order to optimize non-linear effects in the parametric amplification device.

5. The system according to claim 4, wherein the at least one controller device is configured to control the delay and the phase within the first filter arranged at the output of the parametric amplification device, in order to optimize the non-linear effects in the second harmonic generator.

6. A system for generating short optical pulses, with a spectrum centered about a wavelength $\lambda/2$, the system comprising:
the system according to claim 2; and
another second harmonic generator.

7. The system according to claim 1, wherein the first generator of optical pulses uses an amplification system to amplify by materials doped with Erbium ions.

8. The system according to claim 1, wherein the first pulse generator comprises a non-linear system configured to output pulses of a duration less than 10picoseconds at a wavelength substantially equal to $\lambda$ using the pulses of awavelength substantially equal to $2*\lambda/3$supplied by the second pulse generator.

9. The system according to claim 7, further comprising:
at least one controller device configured to control the delay and the phase arranged before the recombination device, in order to optimize non-linear effects in the parametric amplification device.

10. A system for generating short optical pulses, with a spectrum centered about a wavelength $\lambda/2$, the system comprising:
the system according to claim 7; and
another second harmonic generator.

11. The system according to claim 1, wherein the second pulse generator comprises a non-linear system configured to output pulses of a duration less than 10picoseconds at a wavelength substantially equal to $2*\lambda/3$using the pulses of a wavelength substantially equal to $\lambda$ supplied by the first pulse generator.

12. The system according to claim 8, further comprising:
at least one controller device configured to control the delay and the phase arranged before the recombination device, in order to optimize non-linear effects in the parametric amplification device.

13. A system for generating short optical pulses, with a spectrum centered about a wavelength $\lambda/2$, the system comprising:
the system according to claim 8; and
another second harmonic generator.

14. The system according to claim 1, further comprising:
at least one controller device configured to control the delay and the phase arranged before the recombination device, in order to optimize non-linear effects in the parametric amplification device.

15. The system according to claim 11, further comprising:
at least one controller device configured to control the delay and the phase arranged before the recombination device, in order to optimize non-linear effects in the parametric amplification device.

16. A system for generating short optical pulses, with a spectrum centered about a wavelength $\lambda/2$, the system comprising:
the system according to claim 11; and
another second harmonic generator.

17. A system for generating short optical pulses, with a spectrum centered about a wavelength $\lambda/2$, the system comprising:
the system according to claim 1; and
another second harmonic generator.

18. The system according to claim 17, further comprising a third generator configured to generate a wavelength $\lambda/2$compatible with an amplification through the use of Titanium-doped sapphire material.

19. A system for generating short optical pulses, with a spectrum centered about a wavelength $\lambda/2$, the system comprising:
the system according to claim 14; and
another second harmonic generator.

20. The system according to claim 14, wherein the at least one controller device is configured to control the delay and the phase within the first filter arranged at the output of the parametric amplification device, in order to optimize the non-linear effects in the second harmonic generator.

* * * * *